(12) United States Patent
Logan et al.

(10) Patent No.: US 9,013,993 B2
(45) Date of Patent: Apr. 21, 2015

(54) VIRTUALIZED OPEN WIRELESS SERVICES SOFTWARE ARCHITECTURE

(75) Inventors: James L. Logan, Southborough, MA (US); Deepak Garg, Nashua, NH (US); Tim Mortsolf, Amherst, MA (US)

(73) Assignee: Affirmed Networks, Inc., Acton, MA (US)

( * ) Notice: Subject to any disclaimer, the term of this patent is extended or adjusted under 35 U.S.C. 154(b) by 289 days.

(21) Appl. No.: 13/399,214

(22) Filed: Feb. 17, 2012

(65) Prior Publication Data
US 2013/0215758 A1 Aug. 22, 2013

(51) Int. Cl.
*H04W 72/04* (2009.01)
*H04W 24/02* (2009.01)
*H04W 28/16* (2009.01)

(52) U.S. Cl.
CPC .............. *H04W 24/02* (2013.01); *H04W 28/16* (2013.01)

(58) Field of Classification Search
None
See application file for complete search history.

(56) References Cited

U.S. PATENT DOCUMENTS

| 8,522,241 B1* | 8/2013 | Vohra et al. ................... 718/100 |
| 2003/0171114 A1* | 9/2003 | Hastings .................... 455/426.2 |
| 2003/0187982 A1 | 10/2003 | Petit |
| 2006/0294238 A1 | 12/2006 | Naik et al. |
| 2009/0124284 A1* | 5/2009 | Scherzer et al. ........... 455/552.1 |
| 2009/0300173 A1* | 12/2009 | Bakman et al. ................ 709/224 |
| 2010/0238840 A1 | 9/2010 | Lu et al. |
| 2010/0317331 A1* | 12/2010 | Miller ........................... 455/416 |
| 2013/0173804 A1* | 7/2013 | Murthy et al. ................ 709/226 |

OTHER PUBLICATIONS

International Search Report and Written Opinion received for PCT Patent Application No. PCT/US12/25577, mailed on May 21, 2012, 7 pages.

* cited by examiner

*Primary Examiner* — Chi H Pham
*Assistant Examiner* — Shick Hom
(74) *Attorney, Agent, or Firm* — Wilmer Cutler Pickering Hale and Dorr LLP

(57) ABSTRACT

Methods and apparatus, including computer program products, for virtualized open wireless services software architecture. A method includes, in a mobile network, monitoring hardware resources for utilization, receiving a request to instantiate a service, selecting a hardware resource that is underutilized, and mapping the service to the underutilized hardware resource.

21 Claims, 3 Drawing Sheets

is a flow diagram illustrating a grid resource management process, according to some embodiments of the present disclosure.

VIRTUALIZED OPEN WIRELESS SERVICES SOFTWARE ARCHITECTURE

BACKGROUND OF THE INVENTION

The invention generally relates to wireless networks, and more specifically to a virtualized open wireless services software architecture.

Wireless networks include many different functions that are typically mapped to different devices. For example, a 3G/4G network includes base stations, Radio Network Controllers (RNCs), Serving GPRS Support Nodes (SGSNs), Gateway GPRS Support Nodes (GGSNs), Serving Gateways (SGWs), Packet Data Network Gateways (PGWs), Mobile Management Entities (MMEs), Digital Phone Interface (DPI) probes, traffic analyzers, firewalls, Policy and Charging Rules Functions (PCRFs), Authentication, Authorization, and Accounting (AAA) servers, Lightweight Directory Access Protocol (LDAP) databases, charging servers, Hypertext Transfer Protocol (HTTP) proxies, traffic optimizers, video optimizers, and so forth. As these wireless networks have evolved, each additional function that is added has required the introduction of a new device that hosts that function or multiple hardware processors in the same device hosting different functions.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus, including computer program products, for a virtualized open wireless services software architecture.

In general, in one aspect, the invention features a method including, in a mobile network, monitoring hardware resources for utilization, receiving a request to instantiate a service, selecting a hardware resource that is underutilized, and mapping the service to the underutilized hardware resource.

On another aspect, the invention features a server including central processing units, and a memory, the memory including an operating system and grid resource management process, the grid resource management process including monitoring hardware resources in a mobile network for utilization, receiving a request to instantiate a service, selecting a hardware resource that is underutilized, and mapping the service to the underutilized hardware resource.

Other features and advantages of the invention are apparent from the following description, and from the claims.

BRIEF DESCRIPTION OF THE DRAWINGS

The invention will be more fully understood by reference to the detailed description, in conjunction with the following figures, wherein.

DETAILED DESCRIPTION

Figure 1:
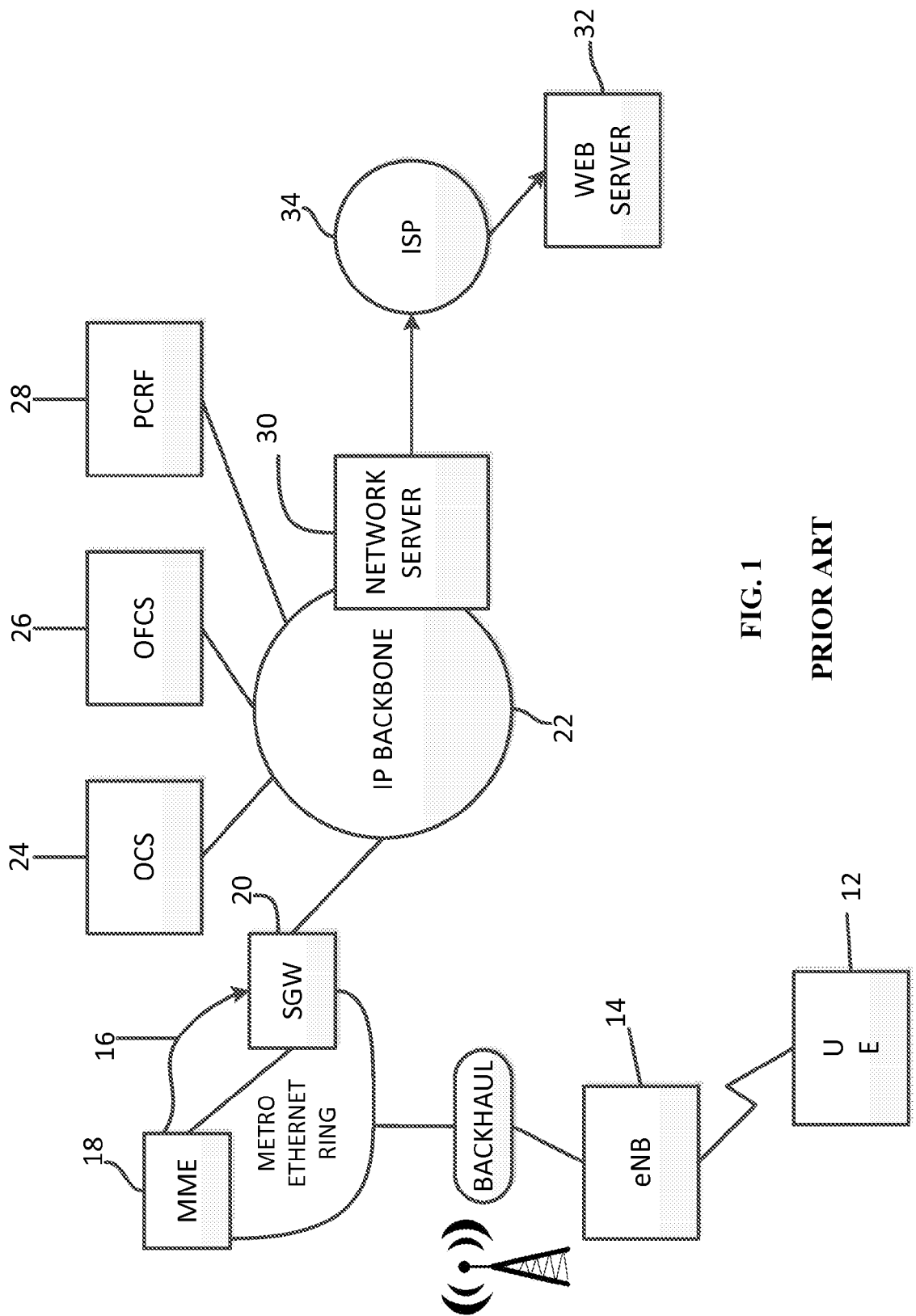
FIG. 1 is a block diagram illustrating a mobile network, according to some embodiments of the present disclosure.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "subscriber station," "communication device," "access terminal," "terminal," "handset," and similar terminology, refer to a wireless device (e.g., cellular phone, smart phone, computer, personal digital assistant (PDA), set-top box, Internet Protocol Television (IPTV), electronic gaming device, printer, etc.) utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms.

In a distributed, high availability environment, where each hardware node in a network runs a mix of active and standby applications, and, where the standby applications do not require the same amount of physical resources as the active applications, the requirements for physical resources (e.g. CPU, memory, disk space, bandwidth) is not usually taken into consideration when assigning applications to run on a hardware node. The standby applications are backing up active applications distributed across the collection of hardware, and, at any given time only a subset of the applications may go active. Since this fact is not considered when assigning applications to hardware nodes, there is an inherent underutilization of the resources.

For example, wireless networks include many different functions which are typically mapped to different devices. A typical 3G/4G network can include base stations (BSs), RNCs, SGSNs, GGSNs, SGWs, PGWs, MMEs, DPI probes, traffic analyzers, firewalls, PCRF, AAA servers, LDAP databases, charging servers, HTTP proxies, traffic optimizers, video optimizers and so forth. As these networks have evolved, each additional function that is added has required the introduction of a new device that hosts that function or multiple hardware processors in the same device hosting different functions. This approach causes some major problems.

The approach leads to inefficient use of resources. Since the functions are mapped to processing resources in a relatively static manner, this potentially leads to scenarios where some devices are underutilized and some overloaded, with no flexibility to use underutilized processing resources to offload the overload devices.

The approach leads to scalability issues. As the demand on the network increases, each device has to be scaled up independently to manage the increased load which is sub-optimal from a cost perspective. In addition, as new functions are added, new devices have to be added to the network.

The approach leads to management issues. The more devices there are, the harder it is to monitor and maintain them. Typically each device has its own management interface, and integrating them into a single management platform becomes very complex. Alternatively, the operator has to deal with multiple management platforms.

The approach leads to inflexibility in ordering of functions. Different end-end services may require a different ordering in functions. For example, one service may require charging before the firewall function, and another may require the reverse. Since these functions are on different devices, the ordering is a function of how they are wired up and therefore fairly static. Trying to change the order leads to multiple extra hops for traffic which is highly inefficient as well as increases latency.

The approach can lead to complexity of service instantiation. Any time a new service is introduced, multiple functions have to be configured to instantiate the end-end service. This is a cumbersome and error prone process since the configuration on multiple devices has to be modified. In addition, an error in configuring one of these devices could impact existing services. Furthermore, the complexity associated with this process means that it takes a lot of effort and a lot of time from when a service is identified to when it is actually executed. As a consequence, most operators only enable services that are very lucrative and long lasting, and miss out on opportunities for services that may be less lucrative and more short term (for example, offering premium access to a sporting event).

The approach can lead to a closed software environment. The software architecture of the devices that make up the network are designed specifically to support the function they have been built for by the vendors that provide them and are therefore closed in the sense that the operator cannot use the processing resources of these platforms to host nay other functions (related or unrelated to the original function) that they may want to. Even though the operator has bought the processing resources, they are very limited in what these resources can be used for.

The invention described herein characterizes the amount of physical resources required by applications while in their active and standby roles, and maps the distribution of active/standby processes within the collection of hardware nodes. This results in maximized hardware utilization by strategically assigning applications to run on hardware nodes based on their physical resource requirements and high availability state.

The invention described herein applies to all wireless networks regardless of access technology, including Global System for Mobile (GSM), Code Division Multiple Access (CDMA), Long Term Evolution (LTE), WiMAX and so forth. For ease of explanation, the invention will is described in a 4G network environment.

As shown in FIG. 1, an exemplary mobile network 10 includes user equipment (UE) 12, such as a smart phone. Other examples of US 12 include, but are not limited to, cellular phone, computer, personal digital assistant (PDA), set-top box, Internet Protocol Television (IPTV), electronic gaming device, printer, tablet, Wi-Fi Hotspot and so forth. The UE 12 is wirelessly linked to an Evolved Node B (eNB) 14. The eNB 14 is a radio part of a cell site. A single eNB may contain several radio transmitters, receivers, control sections and power supplies. The eNB 14 is backhauled to a metro ethernet ring 16, which includes a Mobility Management Entity (MME) 18 and a Serving Gateway (SGW) 20. Backhaul is a process of transferring packets or communication signals over relatively long distances to a separate location for processing. The SGW 20 routes and forwards user data packets, while also acting as the mobility anchor for a user plane during inter-eNodeB handovers.

The SGW 20 is linked to an Internet Protocol (IP) backbone 22. The IP backbone 22 includes links to a Online Charging System (OCS) 24, an Offline Charging Subsystem (OFCS) 26 and a Policy Control and Charging Function (PCRF) 28. In general, the OCS 24 is a set of interconnected network elements that enable the identification, rating and posting of charges in real time (or near real time). The OFCS 26 receives charging data in the form of Call Detail Records (CDRs) and Diameter accounting messages from network elements after the subscriber incurs network resource usage.

The IP backbone 22 includes a network server 30 that implements virtualized open wireless services software architecture for 3G and 4G mobile networks. The network server 30 is linked to a web server 32 through an Internet Service Provider (ISP) 34.

Figure 2:
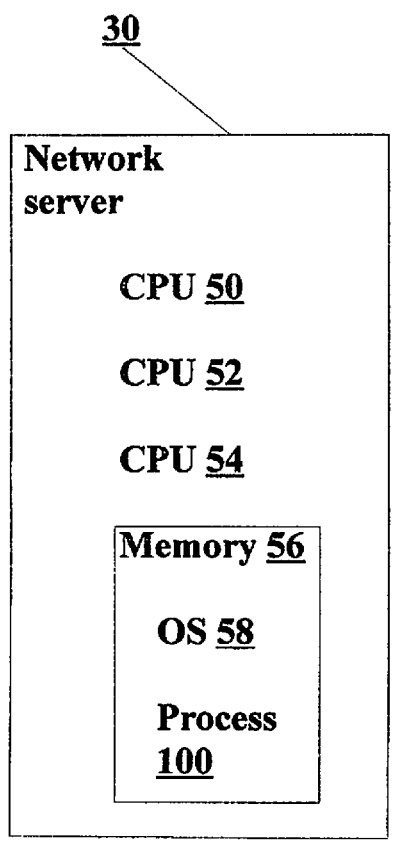
FIG. 2 is a block diagram illustrating a network server in a mobile network, according to some embodiments of the present disclosure.

As shown in FIG. 2, the network server 30 includes one or more a central processing units (CPUs) 50, 52, 54 and a memory 52. Memory 52 includes at least an operating system (OS) 54, such as Linux, and grid resource management process 100. The grid resource management process 100, described below, monitors hardware resources, determines their utilization over time, and maps/re-maps software processes into hardware resources, e.g., the one or more a central processing units (CPUs) 50, 52, 54, according to their availability and utilizations. In addition, the grid resource management process 100 can monitor utilization of other hardware resources within the exemplary mobile network 10 and map/re-map software processes into these other hardware resources, enabling a virtualized open wireless services software architecture.

Monitoring the one or more CPUs 50, 52, 54, can be implemented in a number of ways. For example, In the Linux OS, monitoring can be done using "mpstat" and other tools.

Figure 3:
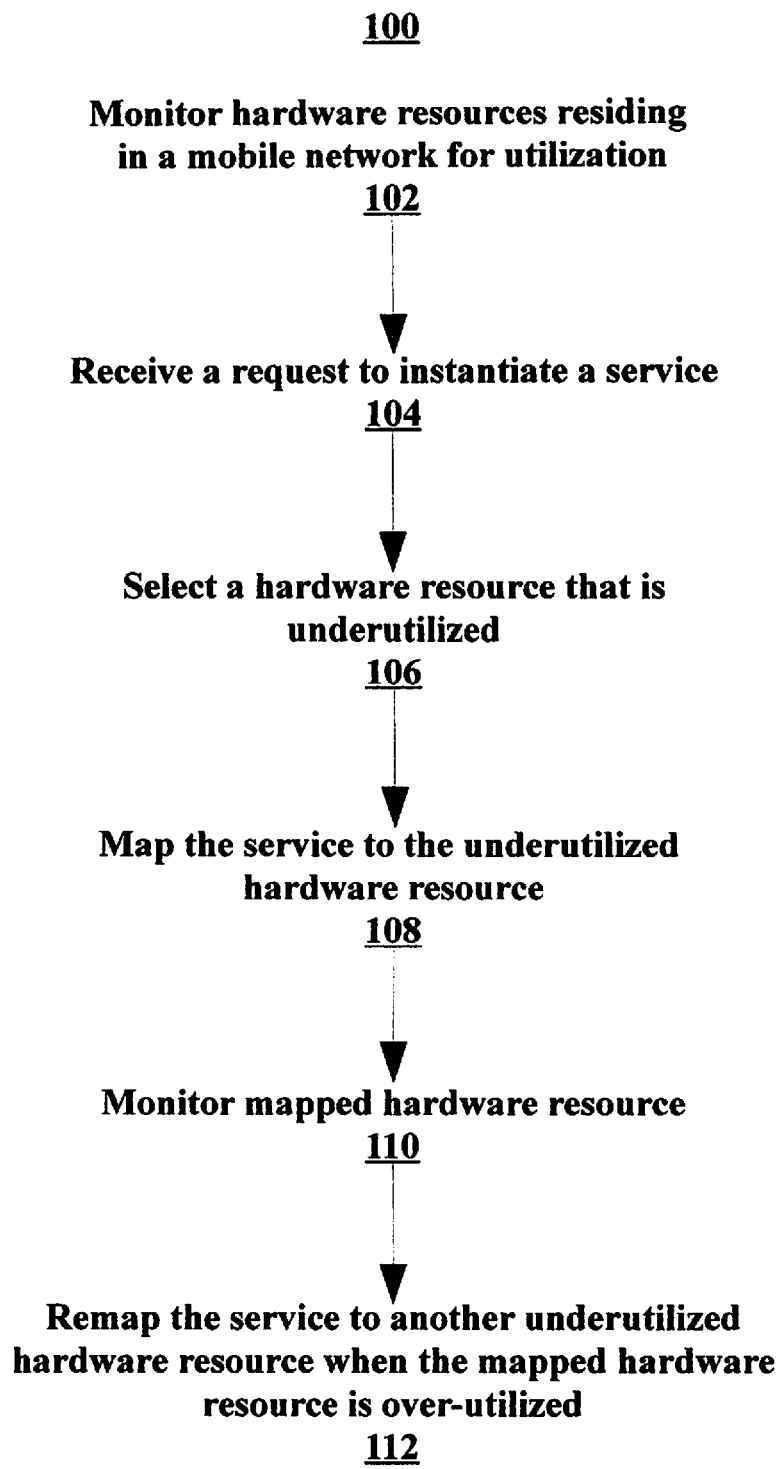
FIG. 3 is a flow diagram illustrating a grid resource management process, according to some embodiments of the present disclosure.

As shown in FIG. 3, the grid resource management process 100 includes monitoring (102) hardware resources residing in a mobile network for utilization.

The grid resource management process 100 receives (104) a request to instantiate a service.

Services that the grid resource management service 100 can intelligently map/remap to hardware resources may include a network firewall service, a serving gateway (SGW) service, a packet data network gateway (PGW) service, a HTTP Web proxy service, a video proxy service, a service module, and so forth.

The SGW service routes and forwards user data packets and acts as an anchor for mobility between LTE and other 3GPP technologies.

The PGW service provides connectivity from user equipment to external packet data networks by being a point of exit and entry of traffic for the user equipment. The PGW service performs policy enforcement, packet filtering for each user, charging support, lawful interception and packet screening.

The HTTP Web proxy service acts as an intermediary for requests from clients seeking resources from other servers. The HTTP Web proxy service provides web caching, web translating and web transcoding.

The video proxy service provides video caching, video translating and video transcoding. In addition, this module provides related services involving content manipulation such as advertisement insertion, splicing content together or rewriting adaptive bit rate manifest files.

The service module provides a number of services, such as, for example, Radius/Diameter, Policy Personal Eventing Protocol (PEP), Packet Forwarding, Content Filtering, Session Management, Domain Name System (DNS) Service, Access Control, Packet Inspection, Session Term, IP Transport I/O, a charging function, a policy enforcement function, a traffic steering function, a latency service function, and so forth.

The charging function refers to an ability to selectively charge mobile subscribers and/or content partners based on a per flow basis by applying differentiated billing plans based on flow characteristics such as volume of packets, amount of time the flow is active, and the application associated with the flow as determined by shallow or deep packet inspection of the packet(s) in the flow or by analyzing the flow heuristics (e.g., signature analysis), or other parameters associated with servicing the flow such as time of day.

The policy enforcement function refers to an ability to apply subscriber related QoS and gating policies to a subscriber flow on a per-flow basis, where the flow is determined by shallow or deep packet inspection, or heuristic analysis (e.g., signature analysis) of the flow pattern.

The latency service refers to an ability to measure network round trip latency between any selected subscriber or set of subscribers and the gateway function in the wireless core.

The grid resource management process 100 selects (106) a hardware resource that is underutilized.

The grid resource management process 100 maps (108) the service to the underutilized hardware resource.

The grid resource management process 100 monitors (110) mapped hardware resource.

The grid resource management process 100 remaps (112) the service to another underutilized hardware resource when the mapped hardware resource is over-utilized.

The grid resource management process 100 provides an open and modular software architecture that maps wireless network functions to processing resources in a virtualized environment that can be run on any standard processor device like a datacenter solution. The grid resource management process 100 maps functions to available processor resources dynamically. Since the functions are run in a virtual environment, they can be stitched together in a different order for different services. In addition to implementing standard wireless functions as virtual software modules, the architecture allows the operator to plug in their own modules both for protocol analyzers and for additional functions that they want to host on the platform.

This architecture addresses the problems raised by outdated methods. Since the functions are virtual and can be mapped to processor resources at a granular level (on a per process basis), the processor is allocated to these functions in small increments of processor capacity. This maximizes the efficiency of processor usage since only the amount needed for a function is allocated.

Since the allocations of functions to resources are done dynamically in small increments, each function can be scaled as required according to the needs of a particular deployment and dynamically changing network conditions, applications and user behavior. In addition, since the processing resources are generic, it is easy to add additional resources to the platform when needed and allocate these resources to any function based on scaling needs.

Since multiple functions can be mapped to a single scalable platform with generic resources, a number of functions can be hosted on the same platform. It is much easier to manage a single platform running multiple functions in an integrated manner than multiple platforms running single functions.

Since the functions are running in a virtualized environment as software process on the same platform, they can be invoked in any order for any flow.

There can be a single management interface for multiple functions that allows these functions to be stitched together in any order with ease, end to end service instantiation becomes easy. Service instantiation involves a planning exercise, and easy configuration through a service aware configuration interface that allows the operator to specify protocol analyzers for flow classification and a service workflow that is series of functions that are instantiated and stitched together in the desired order. This allows the operator to quickly turn services on and off and take advantage of short term service opportunities.

Creating a modular and virtualized environment enables a "service platform" where the operator is empowered to plug in their own protocol analyzers and software functions, and use these plugged in modules to instantiate services using the service workflow mechanism.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back-end component (e.g., a data server), or that includes a middleware component (e.g., an application server), or that includes a front-end component (e.g., a client computer having a graphical user interface or a web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here. For example, various forms of the flows shown above may be used, with steps re-ordered, added, or removed. Accordingly, other implementations are within the scope of the following claims.

What is claimed is:

1. A method comprising:
   in a mobile network, monitoring a plurality of hardware resources for utilization, each of the plurality of hardware resources designed to support at least one mobile network function;
   receiving a request to instantiate a service corresponding to at least one mobile network function;
   identifying a plurality of underutilized hardware resources;
   selecting from among the plurality of underutilized hardware resources an underutilized hardware resource having a most favorable design corresponding to the requested service;
   mapping the service to the underutilized hardware resource;
   monitoring the mapped hardware resource; and
   remapping the service to another underutilized hardware resource when the mapped hardware resource is overutilized.

2. The method of claim 1 wherein the service is selected from the group consisting of a network firewall service, a serving gateway (SGW) service, a packet data network gateway (PGW) service, a HTTP Web proxy service, a video proxy service, a service module and a custom service.

3. The method of claim 2 wherein the SGW service routes and forwards user data packets and acts as an anchor for mobility between Long Term Evolution (LTE) and other 3GPP technologies.

4. The method of claim 2 wherein the PGW service provides connectivity from user equipment to external packet data networks by being a point of exit and entry of traffic for the user equipment.

5. The method of claim 2 wherein the HTTP Web proxy service acts as an intermediary for requests from clients seeking resources from other servers.

6. The method of claim 2 wherein the video proxy service provides video caching, video translating and video transcoding.

7. The method of claim 2 wherein the service module is selected from the group consisting of a Radius/Diameter service, a Policy Personal Eventing Protocol (PEP) service, a Packet Forwarding service, a Content Filtering service, a Session Management service, a Domain Name System (DNS) service, an Access Control service, a Packet Inspection service, a Session Term service, an IP Transport I/O service, a charging function service, a policy enforcement function service, a traffic steering function service, and a latency service function service.

8. The method of claim 1 wherein the hardware resources are selected from the group consisting of central processor units (CPUs), memory, disk space, and bandwidth.

9. A server comprising:
   central processing units; and
   a memory, the memory comprising an operating system and grid resource management process, the grid resource management process comprising:
      monitoring a plurality of hardware resources in a mobile network for utilization, each of the plurality of hardware resources designed to support at least one mobile network function;
      receiving a request to instantiate a service corresponding to at least one mobile network function;
      identifying a plurality of underutilized hardware resources;
      selecting from among the plurality of underutilized hardware resources an underutilized hardware resource having a most favorable design corresponding to the requested service;
      mapping the service to the underutilized hardware resource;
      monitoring the mapped hardware resource; and remapping the service to another underutilized hardware resource when the mapped hardware resource is overutilized.

10. The server of claim 9 wherein the service is selected from the group consisting of a network firewall service, a serving gateway (SGW) service, a packet data network gateway (PGW) service, a HTTP Web proxy service, a video proxy service, a service module and a custom service.

11. The server of claim 10 wherein the SGW service routes and forwards user data packets and acts as an anchor for mobility between Long Term Evolution (LTE) and other 3GPP technologies.

12. The server of claim 10 wherein the PGW service provides connectivity from user equipment to external packet data networks by being a point of exit and entry of traffic for the user equipment.

13. The server of claim 10 wherein the HTTP Web proxy service acts as an intermediary for requests from clients seeking resources from other servers.

14. The server of claim 10 wherein the video proxy service provides video caching, video translating and video transcoding.

15. The server of claim 10 wherein the service module is selected from the group consisting of a Radius/Diameter service, a Policy Personal Eventing Protocol (PEP) service, a Packet Forwarding service, a Content Filtering service, a Session Management service, a Domain Name System (DNS) service, an Access Control service, a Packet Inspection service, a Session Term service, an IP Transport I/O service, a charging function service, a policy enforcement function service, a traffic steering function service, and a latency service function service.

16. The server of claim 9 wherein the hardware resources are selected from the group consisting of central processor units (CPUs), memory, disk space, and bandwidth.

17. The server of claim 9 wherein the service is selected from standby applications backing up active applications distributed across a collection of hardware.

18. The method of claim 1 wherein the mobile network functions comprise functions related to at least one of base stations, radio network controllers (RNCs), serving general packet radio service (GPRS) support nodes (SGSNs), gateway GPRS support nodes (GGSNs), serving gateways (SWGs), packet data network gateways (PGWs), mobility management entities (MMEs), digital phone interface (DPI) probes, traffic analyzers, firewalls, policy and charging rules function (PCRF), authentication, authorization, and accounting (AAA) servers, lightweight directory access protocol (LDAP) databases, charging servers, hypertext transfer protocol (HTTP proxies, traffic optimizers and video optimizers.

19. The server of claim 9 wherein the mobile network functions comprise functions related to at least one of base stations, radio network controllers (RNCs), serving general packet radio service (GPRS) support nodes (SGSNs), gateway GPRS support nodes (GGSNs), serving gateways (SWGs), packet data network gateways (PGWs), mobility management entities (MMEs), digital phone interface (DPI) probes, traffic analyzers, firewalls, policy and charging rules function (PCRF), authentication, authorization, and accounting (AAA) servers, lightweight directory access protocol (LDAP) databases, charging servers, hypertext transfer protocol (HTTP) proxies, traffic optimizers and video optimizers.

20. A method comprising:
in a mobile network, monitoring a plurality of hardware resources for utilization, each of the plurality of hardware resources designed to support at least one mobile network function;
receiving a request to instantiate a service corresponding to at least one mobile network function;
identifying a plurality of underutilized hardware resources;
selecting from among the plurality of underutilized hardware resources an underutilized hardware resource having a most favorable design corresponding to the requested service, wherein selecting from among the plurality of underutilized hardware resources the underutilized hardware resource is based at least in part on an amount of isolation of the selected underutilized hardware resource relative to at least one other resource where a redundant active function is running.

21. A server comprising:
central processing units; and
a memory, the memory comprising an operating system and grid resource management process, the grid resource management process comprising:
monitoring a plurality of hardware resources in a mobile network for utilization, each of the plurality of hardware resources designed to support at least one mobile network function;
receiving a request to instantiate a service corresponding to at least one mobile network function;
identifying a plurality of underutilized hardware resources;
selecting from among the plurality of underutilized hardware resources an underutilized hardware resource having a most favorable design corresponding to the requested service, wherein selecting from among the plurality of underutilized hardware resources the underutilized hardware resource is based at least in part on an amount of isolation of the selected underutilized hardware resource relative to at least one other resource where a redundant active function is running.

* * * * *